United States Patent [19]

Dickie et al.

[11] Patent Number: 4,760,299
[45] Date of Patent: Jul. 26, 1988

[54] DISTORTION FREE SYNCHRO

[75] Inventors: Robert J. Dickie, Sun City, Ariz.; Walter J. Krupick, Succasunna, N.J.

[73] Assignee: The Singer Company, Stamford, Conn.

[21] Appl. No.: 60,572

[22] Filed: Jun. 11, 1987

[51] Int. Cl.$^4$ ............... F16F 15/12; G01C 19/04; H02K 5/04
[52] U.S. Cl. ........................ 310/91; 33/324; 74/5.5; 310/43; 310/51; 310/89
[58] Field of Search ............ 310/51, 89, 91, 162, 310/179, 254, 43, 45

[56] References Cited

U.S. PATENT DOCUMENTS

| | | | |
|---|---|---|---|
| 1,688,891 | 10/1928 | Spreen | 310/51 |
| 3,483,407 | 12/1969 | Frohmüller et al. | 310/51 |
| 3,978,357 | 8/1976 | Voelbel et al. | 310/91 |
| 4,206,374 | 6/1980 | Goddijn | 310/162 |
| 4,472,978 | 9/1984 | Levine et al. | 33/321 |

FOREIGN PATENT DOCUMENTS 230446 12/1984 Japan ..................... 310/51

*Primary Examiner*—Patrick R. Salce
*Assistant Examiner*—D. L. Rebsch
*Attorney, Agent, or Firm*—David L. Davis

[57] ABSTRACT

A resilient strain relief elastomer is placed between the stator of a synchro and its housing so that radial distortions of the housing are absorbed by the high shear compliance of the elastomer. Consequently, the stator remains undistorted, and the synchro is able to define accurately the angular position it senses.

10 Claims, 4 Drawing Sheets

DISTORTION FREE SYNCHRO

FIELD OF THE INVENTION

The present invention relates to synchros and more particularly to a synchro isolated from mechanical distortions of the structure it is mounted on.

BACKGROUND OF THE INVENTION

A "synchro" is a generic term, which is used to cover electrical mechanical devices, equivalent to a variable transformer, which provide electrical output information proportional to an a.c. input voltage times some function of the angular displacement of its rotor winding to its stator windings. These devices can be made very accurate, to less than a minute of arc. However, to achieve this accuracy, it is required that the magnetic circuit consisting of the wound internal laminated core, normally called the rotor, the wound laminated structure surrounding it called the stator, and the air gap between them be very uniform, so that the magnetic permeability for a flux generated by windings on the rotor have very little change with rotor rotation. These devices, where high accuracy and stability of output information is required, are very sensitive to radial stresses which cause the rotor or stator to become out of round, which will change the air gap permeability and which can change the magnetic permeability of the stator and rotor cores.

Synchros are typically used to measure angular displacements between gimbals. In many of these applications where maximum accuracy is required, the synchro component with its bearings may support one end of the gimbal, where the rotor hub is fastened to one gimbal and the synchro housing to a fixed structure or another gimbal. Gimbals are typically made of aluminum in order to save weight, provide better thermal conductivity, and reduce costs. The synchro stator is mounted in a housing which matches the stator coefficient of expansion; and the synchro rotor is mounted to a hub which matches the rotor coefficient of expansion. There is a large difference between the coefficient of magnetic steel alloys used for the synchro and the aluminum gimbal. The synchro housing and rotor are tightly clamped to these mounting structures to prevent slippage due to shock and vibration. Consequently, as a result of changes in ambient temperatures and the difference in coefficient of expansion of the materials, the synchro housing is stressed. The temperature stress for large difference in ambient temperatures can be high enough to cause a slippage between the synchro housing and the aluminum gimbal, which will cause nonuniform and nonrepeatable radial distortions to the stator, thereby degrading its accuracy and the repeatability of its calibration.

SUMMARY OF THE INVENTION

To isolate a synchro from its housing, a resilient strain relief isolator in the form of an elastomer is placed between the synchro and its housing at the site between the load path and the stator. A metal ring, made from an alloy with a thermal coefficient of expansion matching that of the stator, has one side thereof bonded to the stator and a second side thereof molded to the elastomer. This bonded-on strain relief isolator absorbs radial housing distortion strains in a compliant shear direction and permits the synchro to remain virtually in an undistorted condition, thereby preserving its electrical integrity.

It is thus an objective of the present invention to incorporate an elastomer into the synchro housing for isolating the synchro from ambient distortions and forces.

It is a second objective of the present invention to incorporate a strain relief isolator into the synchro housing at a location which is fully visible and testable.

It is another objective of the present invention to incorporate a strain relief isolator into the synchro housing early in the assembly procedure so as to realize production savings.

It is yet a further objective of the present invention to disregard the need to match the thermal coefficients of expansion between the synchro stator and the synchro housing, but instead to select a material to match the housing to the gimbal to eliminate the stress on the joint between the housing and gimbal or to save weight.

The above-mentioned objectives and advantages of the present invention will become more apparent and the invention itself will be best understood by reference to the following description of an embodiment of the invention taken in conjunction with the accompanying drawings, wherein:

DETAILED DESCRIPTION OF THE PRESENT INVENTION

Figure 1A:
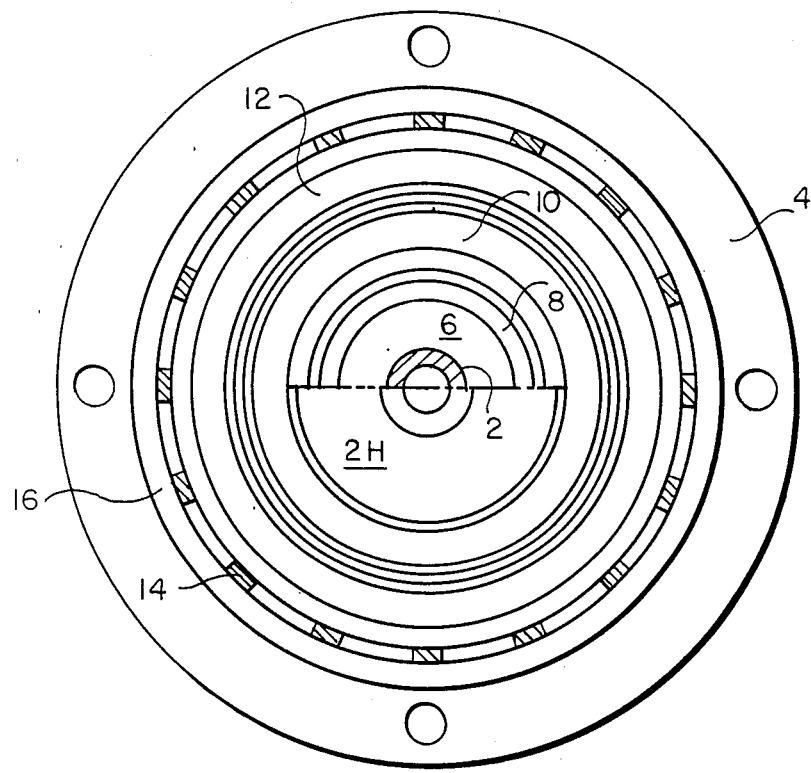
FIG. 1A is a plan view of a prior art synchro.
Figure 1B:
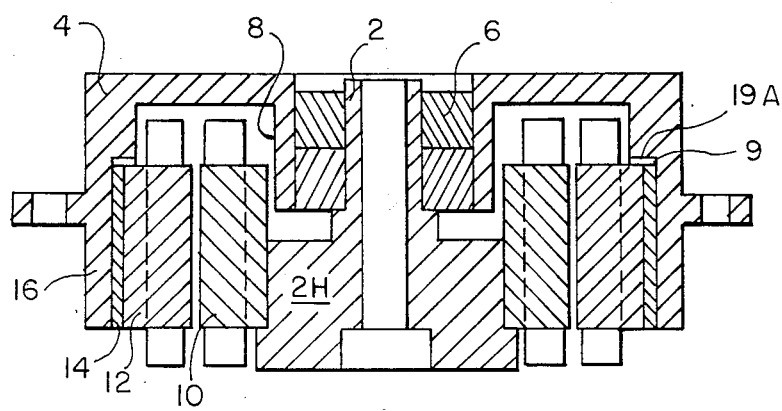
FIG. 1B is a cross-sectional view of the prior art FIG. 1A synchro.

Some synchros have been fabricated with a form of strain relief isolation. A most notable example of this is illustrated in FIGS. 1A and 1B wherein a synchro assembly is shown. A typical synchro assembly includes a rotor hub 2H, whose shaft 2 is mounted coaxially in a housing 4 by means of bearings 6. As best seen in FIG. 1B, housing 4 has a cylindrical section 8 to which the outer races of bearings 6 are mounted. The inner races of bearing 6 are mated to shaft 2 of hub 2H. Bonded to hub 2H is a wound rotor 10, which rotates in tandem with shaft 2. Encircling rotor 10 is a wound stator 12, which is most likely made of magnetic steel alloy laminations. For the prior art synchro assembly, a plurality of axial fingers 14, which are made of an elastomer material, is used to couple stator 12 to a circumferential portion 16 of housing 4. An elastomer gasket 9 is first molded or placed in position against housing surface 19b, and stator 12 is pushed thereagainst. Thereafter elastomer axial fingers 14 are molded in place.

The radial distance between stator 12 and circumferential portion 16 of housing 4 is small, typically between 0.01 and 0.015 inches, and each of the axial fingers 14 is about 0.03 to 0.05 inches wide. Because of the small size it is difficult to make uniform sections and prove that the elastomer sections are void free. Also, radial distortions in the housing portion 16 cause elastomer fingers 14 to be strained in tension or compression. It should be noted that the elastomer is very stiff for this type of strain, as compared to a shear strain. As an example, an elastomer whose width to thickness ratio is 3 is approximately 18 times stiffer in tension and compression than in shear. Using typical stable elastomer materials, the sections are therefore too stiff; and as a result, the desired isolation from radial stresses is not achieved.

Referring now to FIGS. 2A to 2D, a present invention synchro assembly is shown from the top and cross-sectionally. Similar to the conventional synchro assembly, the present invention has a rotor hub 2H, a housing 4, a set of bearings 6, a rotor 10, and a stator 12. As before, shaft portion 2 of hub 2H is mated with the inner races of bearings 6, whose outer races are mated to circumferential lip 8 of housing 4. Rotor 10 is likewise bonded to hub 2H in a technique which is well known to the artisan. Rotor 10 is mounted to gimbal 21, and held in place by a bolt 25. Housing 4 is mounted to support 20, by a fixing means which for example may be a bolt 22.

The present invention housing, unlike prior art, has a circumferential portion 24 that does not extend beyond stator 12, which is separated from circumferential portion 24 by a gap 26. The lower portion of stator 12 is bonded to an angular ring 28. The bonding technique is similar to that used to bond rotor 10 to hub 2H. It uses a conventional epoxy and the technique is quite conventional. To prevent thermal stress, ring 28 is made of a material which matches the expansion coefficient of the stator.

In order to isolate the synchro from radial stresses, designated by arrow 18, due to the difference in expansion between support 20 and housing 4, a resilient strain relief isolator 34, which is made of an elastomer, is molded between rim 24a of the circumferential portion 24 and top 28a of ring 28. This molding is done as a sub-assembly, as shown in FIG. 2C and FIG. 2D and discussed hereinbelow.

A mold positions ring 28 concentric with the center of housing 4 and spaces it to achieve the desired thickness of elastomer isolator 34, and to seal the diameter of elastomer 34C. The elastomer material is injected in place under relatively high pressures and temperatures, and cured in the mold for a controlled period of time. Slots 35, in ring 28, allow the material to be injected in the mold. The excess material at surface 28B can readily be trimmed off without effecting the critical area of isolator 34. By thus molding the elastomer to the housing and ring, the dimensions of the molded elastomer are easily controlled. Thus, the dimensions are more accurate; the molding is faster; and the isolator can readily be inspected for possible defects in the elastomer. Also because it is cured at a high temperature, the isolator is stronger and inherently more stable than materials cured at lower temperatures.

By thus coupling stator 12 to housing 4 via elastomer 34, radial stresses 18 are absorbed in the high compliance shear direction, as compared to the prior art device, where these stresses load the isolator in the very stiff tension and compression direction. For this embodiment, the elastomer has a durometer of approximately 50, a thickness of approximately 0.015 inches, and a width of approximately 0.030 inches. Of course, the dimensions and the durometer of the material selected will be different for different applications and synchro assemblies. The elastomer chosen is made by, for example, the General Electric Company.

Figure 2A:
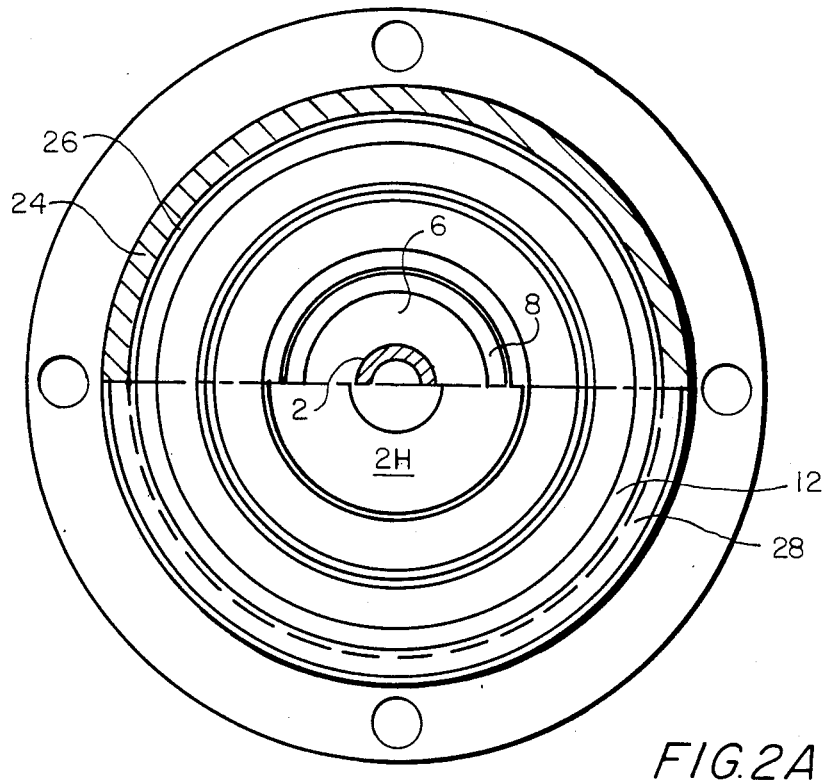
FIG. 2A is a top view of the present invention synchro mounted on a support.
Figure 2B:
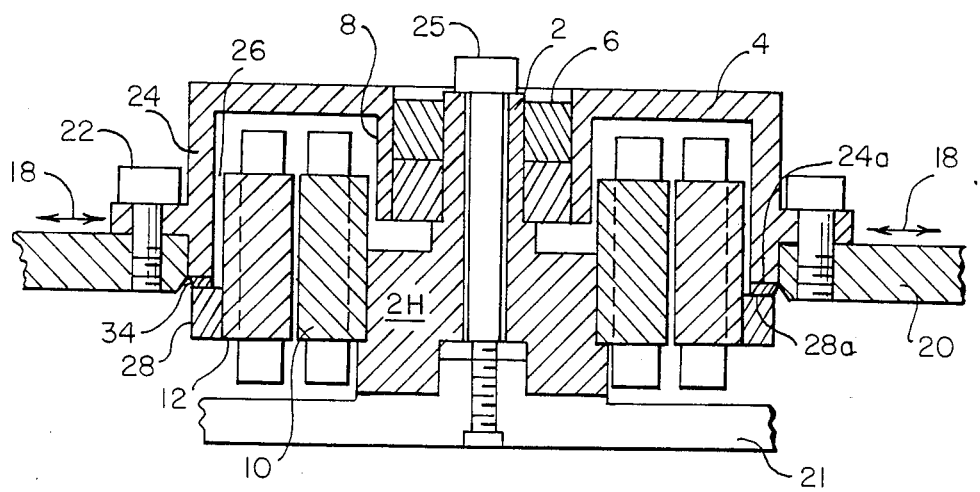
FIG. 2B is a cross-sectional view of the FIG. 2A synchro.
Figure 2C:
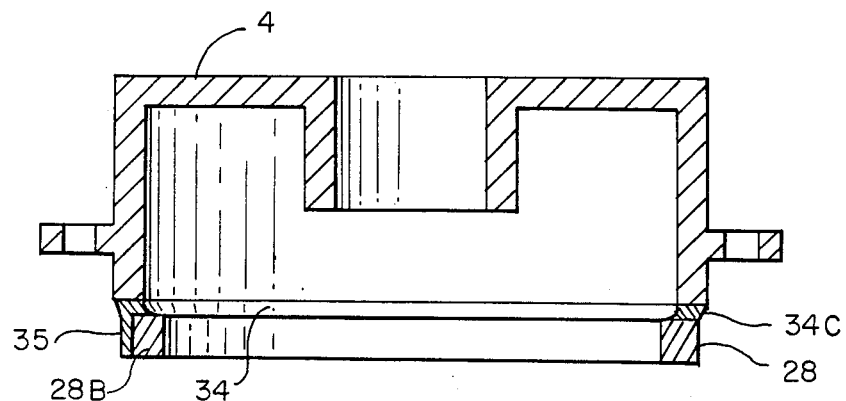
FIG. 2C is a cross-sectional view of a sub-assembly of the invention to show more clearly the strain relief isolator of the present invention.
Figure 2D:
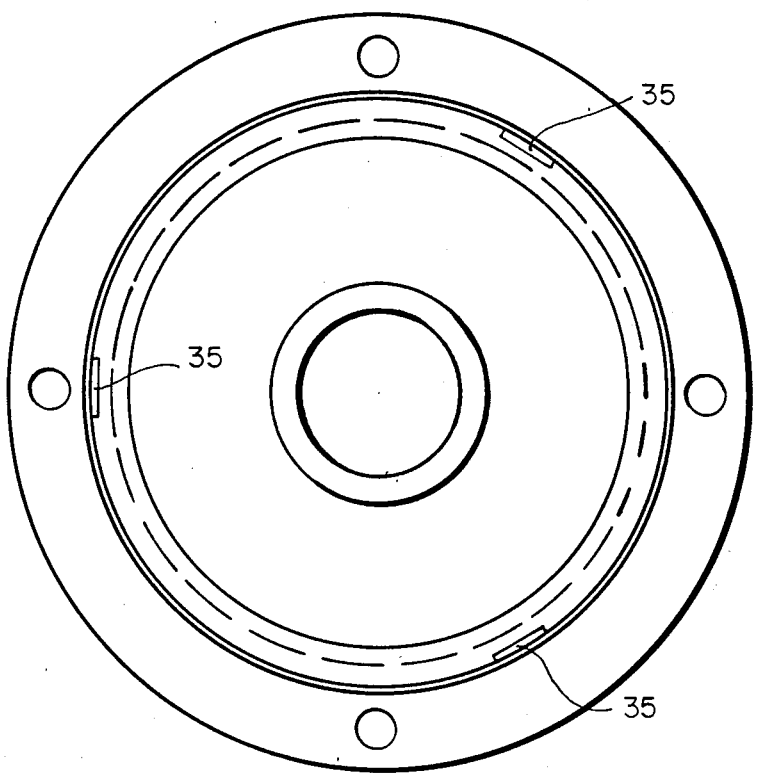
FIG. 2D is a plan view of the FIG. 2C sub-assembly.
Figure 3:
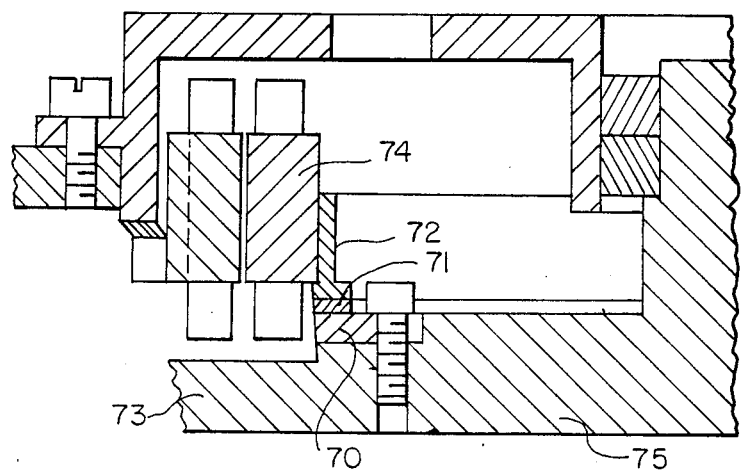
FIG. 3 is a partial cross-sectional view to show the invention as applied to a synchro rotor.

For the FIG. 2B embodiment, no isolator is shown between rotor 10 and hub 2H because the hub is relatively small and stiff and very little of the radial stresses developed between support gimbal 21 and hub 2H are transmitted to stator 10. However, when the rotor is relatively large in diameter, the rotor hub is isolated from the gimbal as shown in FIG. 3. For the FIG. 3 arrangement, an elastomer 71 is molded between rotor hub 72 and a support ring 70 as a sub-assembly and is configured to isolate radial mounting stresses in the compliant shear direction. The material of support ring 70 preferably matches the coefficient of gimbal 75, and the material of hub 72 matches the coefficient of rotor 74.

Figure 4:
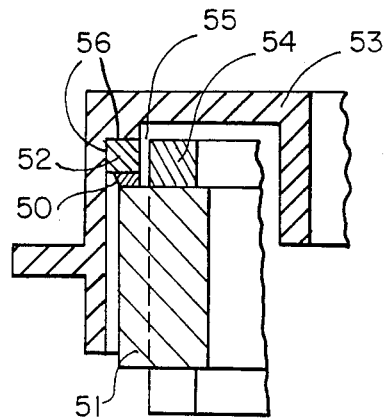
FIGS. 4 and 5 are partial cross-sectional views showing alternate arrangements of the present invention.
Figure 5:
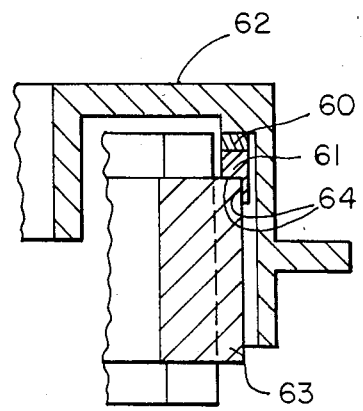

FIG. 4 and FIG. 5 show two alternate arrangements for isolating the stator. In each case the isolator assembly is molded so that radial distortions of the housing which cause shear forces on the elastomer and the isolator can be molded as a separate sub-assembly. Only respective partial sections are shown. In FIG. 4, elastomer 50 is molded to stator 51 and ring 52. Ring 52 is a material having a coefficient of expansion matching that of housing 53. In this arrangement, elastomer 50 is molded between stator 51 and ring 52 before windings 54 are inserted in stator 51. There is a clearance space 55 between the windings 54 and ring 52. After the windings are assembled and cemented in place, the assembly is cemented to housing 53 at surfaces 56.

In FIG. 5, an elastomer 60 is molded between ring 61 and housing 62. Ring 62 is made of a material having a coefficient of expansion matching that of stator 63. Stator 63 is cemented to ring 61 at surfaces 64.

Having thus described the structure of the present invention, it should be clear that were a radial force, due to thermal expansion or otherwise, applied to housing 4 (53, 62), the distortions caused would be absorbed by elastomer 34 (50, 60) and will never reach stator 12 (51, 63). Consequently, the synchro is able to define accurately angular position readings, irrespective of these distortions.

Inasmuch as the present invention is subject to many variations, modifications and changes in detail, it is intended that all matter described throughout this specification and shown in the accompanying drawings be interpreted as illustrative and not in a limiting sense. Accordingly, it is intended that the invention be limited only by the spirit and scope of the appended claims.

We claim:

1. An apparatus for defining angular positions, comprising:
   a support;
   a housing coupled to the support, the housing enclosing a synchro means for defining the angular position thereof relative to the support, the synchro means including a stator encompassing a rotor;
   a shaft mounted axially in the housing in concentric relationship with the rotor, a first portion of the shaft being mated with at least one bearing concentrically mounted within an inner circumferential portion of the housing, the shaft having a second portion bonded to the inner surface of the rotor wherein the rotor is guided by the bearing and rotates relative to the stator, and wherein the stator and the housing have different coefficients of expansion;

a ring circumferentially bonded to the stator and having the same coefficient of expansion as the stator;

means compliantly securing the ring to the housing for isolating the synchro means from dimensional changes of the housing and radial forces applied against the housing;

whereby the angular position is accurately defined by the isolated synchro means.

2. The apparatus according to claim 1, wherein the compliant securing means comprises a resilient strain relief elastomer.

3. A synchro for defining angular positions comprising;
   a shaft;
   at least one bearing having its inner race mated to a first portion of the shaft;
   a housing having an aperture mated to the outer race of the bearing;
   a rotor bonded to a second portion of the shaft, the rotor being located within the housing and rotatable relative thereto;
   a stator positioned in concentric relationship to the rotor, the stator being located within the housing and having a different coefficient of expansion than the housing;
   a ring circumferentially bonded to the stator and having the same coefficient of expansion as the stator, the ring being aligned at least partially with the rim of the housing;
   an annular elastomer molded to the ring and the rim for compliantly coupling the housing to the stator;
   whereby the stator is isolated from dimensional changes of the housing due to temperature variations and radial forces applied against the housing; and
   wherein the combination isolated stator and rotor accurately define the angular positions.

4. An apparatus for defining angular positions, comprising:
   a support;
   a housing coupled to the support, the housing enclosing a synchro means for defining the angular position thereof relative to the support, the synchro means including a stator encompassing a rotor;
   a ring circumferentially bonded to an inside surface portion of the housing and having the same coefficient of expansion as the housing; and
   means compliantly securing the ring to the stator for isolating the synchro means from dimensional changes of the housing and radial forces applied against the housing;
   whereby the angular position is accurately defined by the isolated synchro means.

5. The apparatus according to claim 4, further comprising:
   a shaft mounted axially in the housing in a concentric relationship with the rotor, a first portion of the shaft being mated with at least one bearing concentrically mounted within an inner circumferential portion of the housing, the shaft having a second portion bonded to the inner surface of the rotor;
   wherein the rotor is guided by the bearing and rotates relative to the stator.

6. The apparatus according to claim 4, wherein the stator and the housing have different coefficients of expansion.

7. The apparatus according to claim 4, wherein the compliant securing means comprises a resilient strain relief elastomer.

8. In an apparatus for defining angular positions, the apparatus including a support, a housing coupled to the support, the housing enclosing a synchro means having a stator encompassing a rotor, the rotor having a rotor hub in alignment with a position of a gimbal, the apparatus comprising;
   a first ring circumferentially bonded to the stator and having the same coefficient of expansion as the stator;
   first compliant means securing the first ring to the housing for isolating the synchro means from dimensional changes of the housing and radial forces applied against the housing;
   a second ring circumferentially bonded to the gimbal and having the same coefficient of expansion as the gimbal; and
   second compliant means securing the second ring to the rotor hub for isolating the rotor hub from radial mounting stresses in the compliant shear direction between the gimbal and the rotor hub;
   whereby angular positional measurements are accurately defined.

9. The apparatus according to claim 8, wherein the stator and the housing have different coefficients of expansion.

10. The apparatus according to claim 8, wherein the first and second compliant securing means comprise a resilient strain relief elastomer.

* * * * *